May 13, 1941.  H. S. CAMPBELL  2,241,503
AIRCRAFT
Original Filed March 20, 1937   4 Sheets-Sheet 4

INVENTOR
Harris S. Campbell
BY
Symmestvedt & Lechner
ATTORNEYS

Patented May 13, 1941

2,241,503

UNITED STATES PATENT OFFICE 2,241,503

AIRCRAFT

Harris S. Campbell, Bryn Athyn, Pa., assignor, by mesne assignments, to Autogiro Company of America, a corporation of Delaware Application March 20, 1937, Serial No. 131,994
Renewed August 22, 1939

9 Claims. (Cl. 244—18)

This invention relates to aircraft, especially to that type of craft employing a system of rotative blades as the primary or sole means of sustension in flight.

More particularly, the invention is concerned with propulsion means for aircraft including novel features of structure and arrangement of the propulsion engine, air-screw or air-screws, and transmission mechanism between the engine and air-screw or air-screws, and also with transmission means for delivering torque from the engine to a sustaining rotor for the craft.

One of the outstanding features of the invention is the provision of a power transmission mechanism between the engine and the propeller or propellers, which mechanism is so arranged as to permit location of the engine, with its crank shaft or equivalent, offset from the axis of a propeller driven thereby, especially offset downwardly therefrom, whereby to provide for a relatively low center of gravity of the craft as a whole.

It is a further object to provide for interconnection of the engine and propeller in a manner accommodating an angular relationship between the engine axis and the propeller axis, this being accomplished by the use of a minimum number of gears and other operating parts.

Still further, the invention has in view the provision of a novel transmission or drive mechanism for tandem coaxial propellers, this drive incorporating gearing for rotating the propellers in opposite senses, which gearing is of novel arrangement, completely eliminating any idler gears, all as brought out more fully herebelow.

In accordance with another aspect of the invention, the propeller-drive gearing further has combined therewith, to form a unitary structure, a power take-off means for delivering torque to a sustaining rotor for the craft for the purpose of actuating the rotor prior to take-off from the ground. Preferably also this unit includes clutch mechanisms of novel arrangement, as will appear more fully hereinafter.

How the foregoing objects and advantages are attained, together with others, will be apparent from a consideration of the following description referring to the accompanying drawings, in which—

Figure 1:
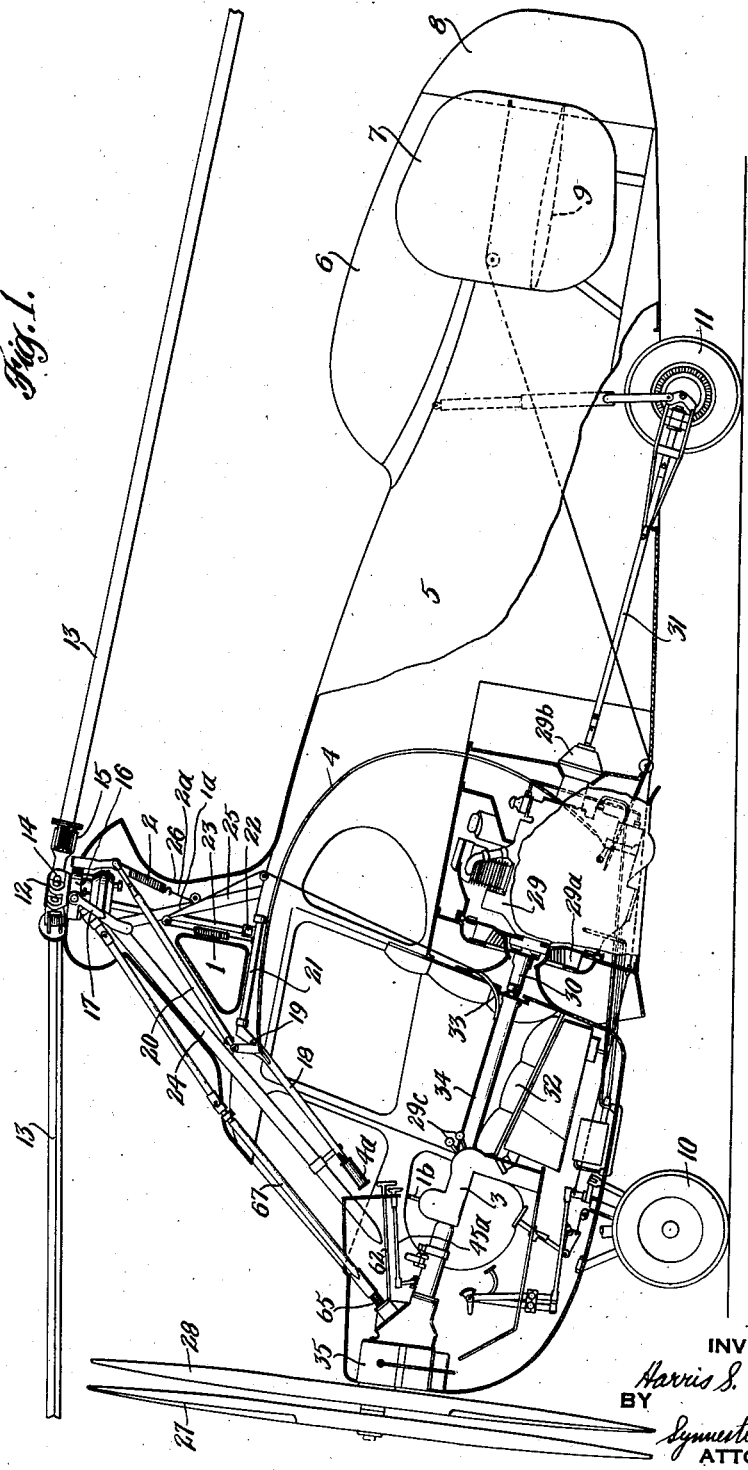
Figure 1 is a side view of an aircraft equipped with the improvements of this invention, some portions of the fuselage covering and the like being shown in vertical section so as to disclose various devices interiorly located.

A fuselage 5 of the craft shown in Figure 1 may be provided with tail surfacing including vertical finning 6 and 7, rudder 8 and horizontal finning 9. The landing gear may comprise a forward pair of wheels 10 and a rear wheel 11, and in the arrangement here shown the craft is provided with a sustaining rotor including a hub 12 to which a plurality of blades 13 are articulated as by "flapping" pivots 14 and "drag" pivots 15. For the purpose of controlling flight maneuvers, the rotor hub is preferably mounted by means of a gimbal ring 16 at the top of a fixed support 17, the mounting providing for tilting of the hub in all directions so as to shift the lift line of the rotor and thus control the craft in flight, all as more fully disclosed in copending application of Juan de la Cierva, Serial No. 645,985, filed December 6, 1932, and in my copending application Serial No. 119,575, filed January 8, 1937, issued March 28, 1939 as Patent No. 2,151,687. Fore and aft tilting of the rotor is effected by similar movements of the control stick 18 about the pivot 19, linkage 20 serving to transmit stick movements to the hub. Lateral tilting of the hub is also accomplished by movement of the control stick 18, in this case in a transverse plane about the axis of shaft 21 which, by means of an arm 22 and linkage 23 transmits the corresponding movement to the hub. These several control connections, together with the pylon posts 24 and 25 for supporting the yoke 17, are desirably enclosed in streamlined fairing or the like shown at 26. The bungee devices 1 and 2 for lateral and longitudinal biasing of the rotor control may also desirably be housed in the casing 26. Adjustment cables 1a and 2a for the bungees are extended downwardly over suitable pulleys in position to the rear of the occupant's compartment and thence forwardly along the drive shaft sleeve 34 (hereinafter described) for connection with control elements such as shown at 1b in Figure 1, mounted within a protecting casing centrally located adjacent the drive shaft extended through sleeve 34, as hereinafter described.

At the nose of the craft a pair of propellers 27 and 28 are mounted, these propellers being driven by an engine indicated generally at 29 through power transmission mechanism fully described below. As to the engine, it will be noted that it is located relatively low in the body of the craft, whereby to keep down the center of gravity of the craft as a whole, and further that the crank shaft 30 of this engine is positioned at an upwardly and forwardly inclined angle. The location of the engine and the angularity of its crank shaft are such that a projection of the crank shaft axis passes approximately through the center of the propellers 27—28 and also approximately through the center of the rear wheel 11, this wheel being adapted to be driven by the engine, through clutch 29b, as by means of shafting 31. Engine and clutch controls for road travel appear at 29c. These general features of arrangement as to the engine and wheel drive are more fully described in the copending application of Harold F. Pitcairn, James G. Ray and Agnew E. Larsen, Serial No. 14,304, filed April 2, 1935, isued October 3, 1939, as Patent No. 2,174,946. It is here noted, however, that the wheel drive is preferably arranged for connection and disconnection, it being contemplated that during flight the drive to the wheel shall be disconnected.

With further reference to the general arrangements, as shown in said copending application Serial No. 14,304, the occupants' compartment, provided with side-by-side seats 32, is positioned just ahead of the engine compartment.

A throttle control for the engine is extended upwardly therefrom in the form of a sheathed cable 4 and thence forwardly over the occupants' compartment for attachment with the hand grip 4a of the control stick 18 which may be rotated to adjust the throttle opening. The engine may also be provided with a rotary cooling fan 29a disposed at the forward side thereof to draw air in through suitable openings in the bottom and/or sides of the fuselage.

Figure 2:
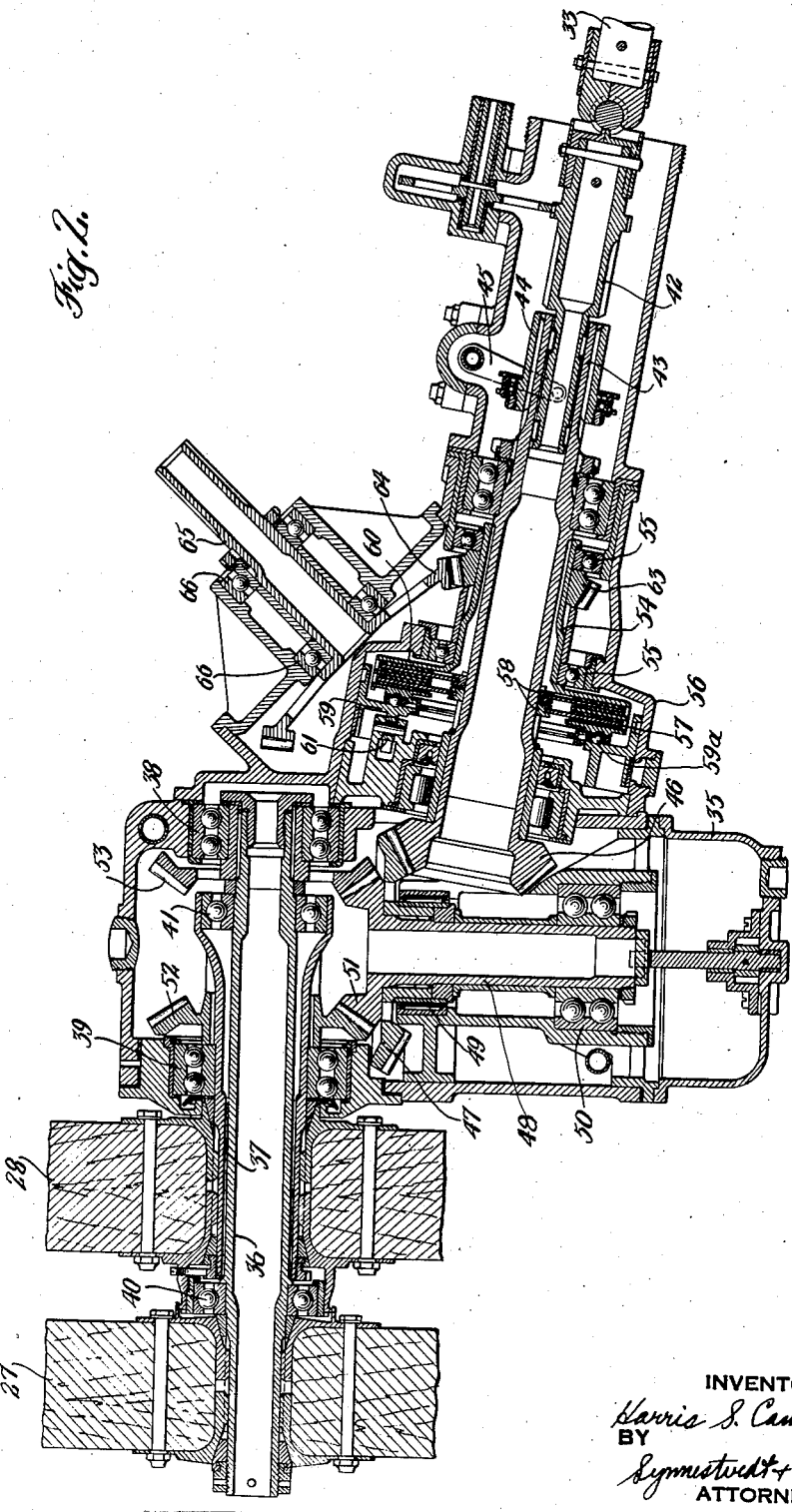
Figure 2 is a vertical sectional view through a portion of the power transmission mechanism shown in outline in Figure 1, for delivering torque from the engine to the propellers and to the rotor.

In accordance with the present invention, a single torque shaft 33 is extended upwardly and forwardly from the crank shaft 30 of the engine, a sheath 34 being provided for this shaft where it passes through the occupants' compartment between the side-by-side seats 32—32, and the forward end of the shaft, as seen in Figure 2, being coupled with the gearing and transmission mechanism incorporated in the housing 35 just to the rear of the propellers. The propellers 27 and 28 are provided with coaxial internal and surrounding axis members or shafts 36 and 37, respectively, these shafts being journalled as by bearings 38, 39, 40 and 41, providing for mounting of the shafts in the housing 35 and for true alignment and running of the two shafts with respect to each other. The propellers and the gear box or casing 35 are thus arranged for unitary mounting in the body of the craft. The drive from shaft 33 which is connected with the engine forwardly to the propeller shafts includes shaft sections 42 and 43 which are adapted to be coupled and uncoupled as by means of the sleeve 44 having splining for transmitting torque from the section 42 to the section 43. The sleeve 44 is adapted to be moved longitudinally of the shafts by means of the control arm or the like 45, controllable by operating connection 45a.

At its forward end the shaft section 43 carries a bevel gear 46 meshing with gear 47 which is connected with the counter-shaft 48 journalled as by bearings 49 and 50. Counter-shaft 48 in turn carries bevel gear 51 which meshes with each of two cooperating gears 52 and 53, the first of which is keyed to shaft 37 for the propeller 28 and the latter of which is keyed to shaft 36 for the forward propeller 27.

For the purpose of delivering torque to the rotor for starting purposes, a hollow shaft 54 is provided surrounding the shaft section 43 and journalled as by bearings 55—55 in the casing extension 56 of the gear box. Shaft 54 may be connected with shaft section 43 by means of the friction disk clutch shown at 57, it being noted that certain disks of this clutch are connected to rotate with the section 43 as at 58. Engagement of the clutch disks is effected by an annular member 59 adapted to bear against the disks, through the intermediation of the ball bearing 59a. The disks are thus put under pressure between the plates 59 and 60, the latter being carried by shaft 54. This is accomplished by movement of the actuating cam device shown at 61 which, see Figure 1, is controllable by means of the link and control element 62.

Shaft 54, toward its rear end, carries a gear 63 meshing with gear 64 provided at the lower end of shaft section 65 which is journalled in the casing for the gearing and transmission unit as at 66—66. By reference to Figure 1 it will be seen that shaft section 65 is coupled by means of flexibly jointed shafting 67 with the rotor hub, whereby to deliver torque thereto.

With regard to all of the gearing, it is pointed out at this time that there is a gear reduction as between shaft section 43 and the counter-shaft 48 and also as between the counter-shaft and the propeller shafts. Still further, the gears 63 and 64 provide for a reduction as between shafts 54 and 65 for the rotor drive. By virtue of these arrangements, the torque loads on the shaft extending forwardly from the engine are reduced and this shaft may therefore be made of relatively light construction. In addition, the arrangement of all of the gearing adjacent the forward end of the engine-coupled shaft 33 provides for the mounting thereof in common within the gear box or casing 35 and its extension 56. It is further to be observed that since this gear box and the propeller shafts themselves are actually mounted as a unit, accurate alignment of the operating parts is always assured, including the driving parts for the rotor.

Other advantages of the type of transmission and drive mechanism described above will be pointed out more fully herebelow following a description of the two other forms of the mechanism.

Figure 3:
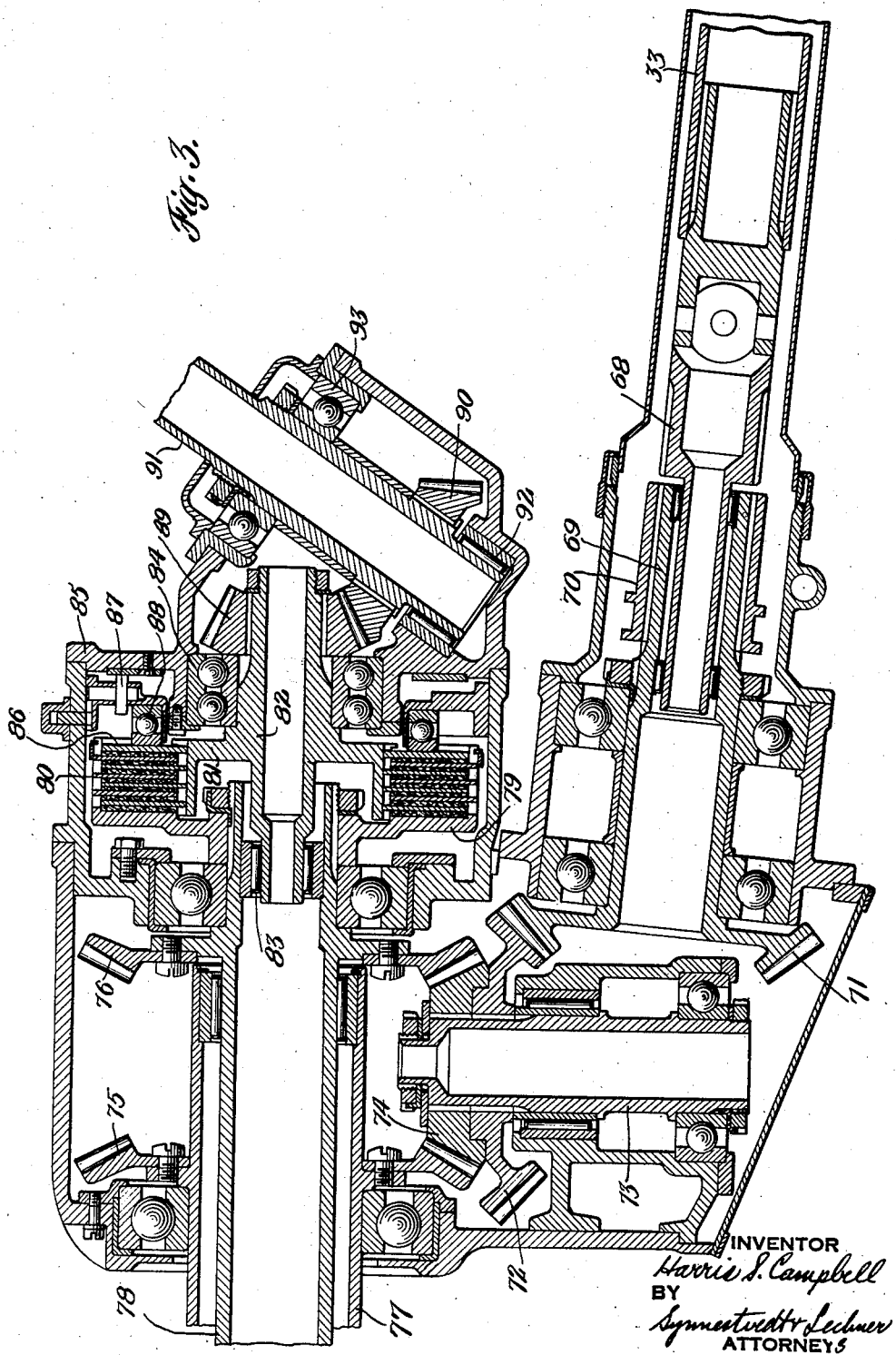
Figure 3 is a view similar to Figure 2 but illustrating a modification of several features shown therein.

Referring now to Figure 3 which illustrates a gearing and transmission unit modified as compared with Figure 2, it will be seen that the engine-coupled shaft 33 is, as in the form of Figure 2, coupled with shaft section 68 through a universal joint, shaft section 68 being connectible with the section 69 as by the clutch sleeve 70. The forward end of shaft section 69 carries gear 71 meshing with cooperating gear 72 mounted on counter-shaft 73 which shaft also carries gear 74 meshing with gears 75 and 76 connected respectively with external and internal propeller shafts 77 and 78.

In the arrangement of Figure 3, the power take-off for the rotor drive, including the clutch therefor, is differently arranged than in Figure 2, particularly with respect to location and the point of power take-off. As here seen, the rear end of the internal propeller shaft 78 carries an annular member 79 to which are connected alternate disks of the disk clutch unit 80. The remaining disks of this unit are rotatable with flange 81 projecting from the short shaft 82 one end of which may be journalled as at 83 internally of the propeller shaft 78' and the other end of which may be provided with bearing 84 mounting it in the casing extension 85. Engagement of the clutch 80 may be effected by advancing the annular part 86 against the disks, as by the cam device 87 and the interposed bearing 88.

At the rear end of the power take-off shaft 82 for the rotor, a gear 89 is arranged, this gear meshing with a cooperating gear 90 carried by shaft 91 which is mounted in the casing extension 85 by bearings 92 and 93. It will be understood that shaft 91 may be suitably coupled with additional shafting extended upwardly to the rotor hub.

In considering the arrangements of Figure 3, it is pointed out that the gear for the propeller drives provides for a reduction as between the engine-coupled shaft 33 and the propeller shaft themselves. It may also be noted that this reduction is also effective for the rotor drive, since the power take-off therefor is so arranged as to receive the torque through the gearing for the propeller shaft 78. Further attention is directed to the fact that in the arrangement of Figure 3 the power take-off for the rotor drive, including the clutch, is separated from the shafts 33, 68 and 69, thus providing for inspection of the rotor drive parts or replacement thereof substantially independently of the coupling of the engine to the propellers. Notwithstanding this independence, the arrangement of Figure 3 also provides for unitary mounting of the rotor drive gearing and the like with the propeller gearing, so as to maintain strict operating alignment of the gearing and other working parts.

Figure 4:
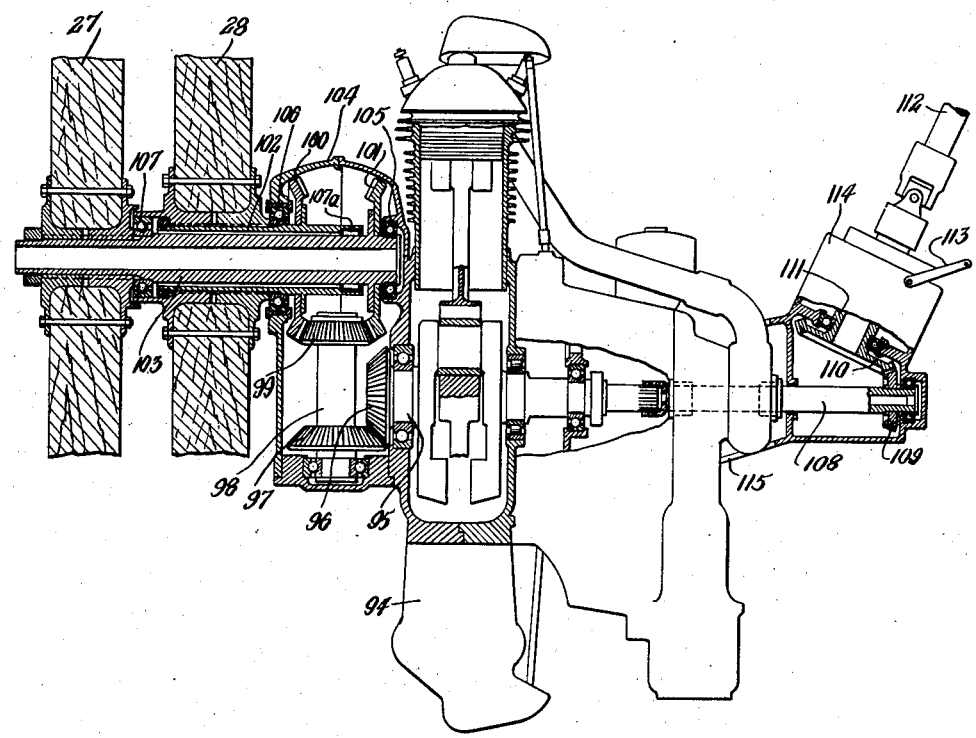
Figure 4 is a vertical sectional view, with some parts shown in elevation, of a modified arrangement for the engine, power transmission devices, and propellers.

The modification of Figure 4 illustrates the manner in which certain features of the drive for tandem and coaxial propellers may be obtained in an arrangement in which the engine itself is mounted in close association with the propellers. Here the engine is shown at 94, the crank shaft thereof appearing at 95 the forward end of which carries gear 96 meshing with gear 97 on counter-shaft 98 which in turn carries gear 99 cooperating with both of gears 100 and 101. These latter two gears are respectively connected with the external and internal propeller shafts 102 and 103, the former driving the rear propeller 28 and the latter the forward propeller 27.

The gearing just described is mounted in a housing 104 directly associated with the engine casing and serving also as a means for supporting the propeller shafts, as by bearings 105 and 106. Additional bearings 107 and 107a may be provided between the propeller shafts.

The rear end of the crank shaft 95 is coupled to an extension 108 carrying bevel gear 109 meshing with gear 110 fixed to shaft 111 which in turn is connected as by shafting 112 with the rotor. A clutch unit, operated by lever 113 may be arranged within the casing 114 which serves to mount the shaft 111, this casing 114 also being directly supported on the engine as by bracket means shown at 115.

In the modification of Figure 4, it will at once be seen that, in addition to the unitary mounting of the propellers and of the gearing therefor and for the rotor, the arrangement also provides for mounting of the engine along with these parts, as a unit. Figure 4 also shows the manner in which tandem propellers may be driven from an engine the axis of which is arranged parallel to the axis of the propellers. In this form, as in the preceding forms, the disposition of the engine is such as to bring its center of gravity substantially below the center of the propellers, this being of importance for reasons mentioned above.

All three arrangements described have in common several important advantages as to the drive for a pair of tandem coaxial propellers. Note for example that this drive provides for rotation of the propellers in opposite senses without the employment of any idler gears. In addition, the total number of gears necessary in the several forms is kept at a minimum, whereby to reduce friction and other power losses, the same gears being used for reversing the drive for tandem propellers and for speed reduction.

The several arrangements disclosed also demonstrate the adaptability of the driving arrangement for tandem propellers, it being pointed out that the improved type of drive may readily be employed to interconnect a power shaft extended at various different angles with respect to the propeller shafts. Different degrees of offset as between the power shaft and the propeller shafts are also readily accommodated in accordance with the invention.

I claim:

1. In an aircraft, a propulsion engine, a sustaining rotor and a propeller arranged with their centers defining a triangular figure, with the engine center appreciably below the other two centers, drive-shafting extended on one leg of said triangle between the engine and the propeller, drive-shafting extended on another leg of said triangle between the propeller and the rotor, drive means for interconnecting the propeller and the adjacent end of the first shafting, and other drive means including a clutch and gearing interconnecting the adjacent ends of said two shaftings.

2. In an aircraft, a propulsion engine, a sustaining rotor and a propeller arranged with their centers defining a triangular figure, with the engine center appreciably below the other two centers, drive-shafting extended on one leg of said triangle between the engine and the propeller, drive-shafting extended on another leg of said triangle between the propeller and the rotor, drive means for interconnecting the propeller and the adjacent end of the first shafting, other drive means including a clutch and gearing interconnecting the adjacent ends of said two shaftings, and a clutch in the shafting first mentioned common to both of said drive means.

3. In an aircraft, a propulsion engine, a sustaining rotor and a propeller arranged with their centers defining a triangular figure, drive shafting extended on one leg of said triangle between the engine and the propeller, drive shafting extended on another leg of said triangle between the propeller and rotor, drive means for interconnecting the adjacent ends of said two shaftings and the propeller, and a clutch concentric with the first shafting and operatively interposed in the drive means interconnecting the adjacent ends of said two shaftings to provide for connection and disconnection of the rotor drive.

4. In an aircraft, a propulsion engine, a sustaining rotor and a propeller arranged with their centers defining a triangular figure, drive shafting extended on one leg of said triangle between the engine and the propeller, drive shafting extended on another leg of said triangle between the propeller and rotor, drive means for interconnecting the propeller and the adjacent end of the first shafting, and means for delivering power from the first shafting to the second shafting to drive the rotor, said last means incorporating a clutch concentric with the first shafting.

5. In an aircraft, a propulsion engine, a sustaining rotor and a propeller arranged with their centers defining a triangular figure, drive shafting extended on one leg of said triangle between the engine and the propeller, drive shafting extended on another leg of said triangle between the propeller and rotor, drive means for interconnecting the propeller and the adjacent end of the first shafting, and other drive means including a clutch and a gear mounted concentrically of the first shafting and serving to interconnect the adjacent ends of the two shaftings.

6. In an aircraft, a propeller arranged toward the front of the craft, a sustaining rotor surmounting the body of the craft, and a propulsion engine in the body to the rear of the propeller, drive shafting interconnecting the engine and the propeller, power transmission means interconnecting the propeller shaft and the rotor, and a disconnectible clutch for the rotor drive mounted concentrically of the propeller shaft and operatively interposed in said power transmission means.

7. In an aircraft, a pair of tandem coaxial propellers arranged at the nose of the craft, a sustaining rotor surmounting the body, a propulsion engine in the body to the rear of the propellers, coaxial propeller shafts, an engine driven shaft extended generally fore and aft in the body of the craft and transmitting power from the engine to the propeller shafts, the forward end of said engine driven shaft being located below the propeller shafts, a countershaft depending at right angles from the propeller shafts and geared thereto and to the engine driven shaft, and power take-off means for driving the rotor including shafting and gearing cooperating with the engine driven shaft.

8. In an aircraft, a pair of tandem coaxial propellers arranged at the nose of the craft, a sustaining rotor surmounting the body, a propulsion engine in the body to the rear of the propellers, coaxial propeller shafts, an engine driven shaft extended generally fore and aft in the body of the craft and transmitting power from the engine to the propeller shafts, the forward end of said engine driven shaft being located below the propeller shafts, a countershaft depending at right angles from the propeller shafts and geared thereto and to the engine driven shaft, power take-off means for driving the rotor including shafting and gearing cooperating with the engine driven shaft, and a clutch for the rotor drive operatively interposed in said power take-off means and arranged concentrically of the engine driven shaft.

9. In an aircraft, a pair of tandem coaxial propellers arranged at the nose of the craft, a sustaining rotor surmounting the body, a propulsion engine in the body to the rear of the propellers, coaxial propeller shafts, an engine driven shaft for delivering power to the propeller shafts, the forward end of said engine driven shaft being located below the propeller shafts, a countershaft depending at right angles from the propeller shafts and geared thereto and to the engine driven shaft, power take-off means for driving the rotor including shafting and gearing cooperating with the engine driven shaft, and a casing housing, journalling, and supporting all of said shafts in common.

HARRIS S. CAMPBELL.